(12) United States Patent
Ling

(10) Patent No.: US 8,824,494 B2
(45) Date of Patent: Sep. 2, 2014

(54) DISTRIBUTED MEDIUM ACCESS CONTROL FOR WIRELESS DATA NETWORKS

(75) Inventor: Jonathan Ling, North Brunswick, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 207 days.

(21) Appl. No.: 13/186,999

(22) Filed: Jul. 20, 2011

(65) Prior Publication Data

US 2013/0022035 A1    Jan. 24, 2013

(51) Int. Cl.
*H04L 12/413* (2006.01)

(52) U.S. Cl.
USPC ............ 370/447; 370/458; 370/461; 370/462

(58) Field of Classification Search
USPC .................. 370/345, 444, 447, 458, 461, 462
See application file for complete search history.

(56) References Cited

U.S. PATENT DOCUMENTS

| | | | | |
|---|---|---|---|---|
| 2007/0211686 A1* | 9/2007 | Belcea et al. | ................. | 370/345 |
| 2009/0225712 A1* | 9/2009 | Stamoulis et al. | ............ | 370/329 |
| 2011/0269459 A1* | 11/2011 | Koo et al. | ..................... | 455/434 |

OTHER PUBLICATIONS

Cidon et al., Distributed Assignment Algorithms for Multihop Packet Radio Networks, IEEE Sep. 1989.*
D. Avidor et al., "A New Distributed MAC Algorithm for Large Wireless Ad-hoc Networks," Proc. of IEEE MILCOM, Oct. 2009.
I. Cidon, M. Sidi "Distributed Assignment algorithms for multihop packet radio networks," IEEE Trans. Comput., vol. 38, No. 10, pp. 1353-1361, Oct. 1989.
I. Chlamtac, A. Farago, A.D. Myers, V.R. Syrotik, and G. Zaruba, "ADAPT: A dynamically self-adjusting media access control protocol for ad-hoc networks," Proc. of IEEE Globecom, vol. 1a, pp. 11-15, 1999.
V. Kawadia, S. Narayanaswamy, R. Rozovsky, R.S. Sreenivas, P.R. Kumar, "Protocols for media access control and power control in wireless networks," Proc. of IEEE Decision and Control, vol. 2, pp. 1935-1940, Dec. 2011.
3DPP TR 36.814. Appendix A.2.1.3.
J. Hammond and H. Russell, "Properties of a transmission assignment algorithm for multiple-hop packet radio networks," IEEE Trans. on Wireless Comm., vol. 3, No. 4, pp. 1048-1052, Jul. 2004.
A. Proutiere, Y. Yi, and M. Chiang, "Throughput of random access with message passing," in Proc. of IEEE CISS, 2008.
D. Bertsekas and R. Gallager, *Data Networks*, Saddle River NJ: Prentice Hall, 1992, p. 275.

(Continued)

*Primary Examiner* — Mark Rinehart
*Assistant Examiner* — Mang Yeung
(74) *Attorney, Agent, or Firm* — Harness, Dickey & Pierce

(57) ABSTRACT

In one embodiment, conflicts are identified by sending and announcement message from the first node to neighboring nodes from among the plurality of second nodes indicating that the first node intends to participate in a first communication with a first terminal during the current frame, and receiving a report message from any conflicting nodes at the first node, each conflicting node being a node from among the neighboring nodes which intends to participate in a different communication. Conflicts are resolved by selecting one of (1) maintaining a state of the first node as a clear state and (2) changing the state of the first node to a blocked state based on the received report messages. The first communication is scheduled for the current time frame, if the state of the first node is the clear state after the resolving conflicts step.

17 Claims, 7 Drawing Sheets

(56) References Cited

OTHER PUBLICATIONS

A.H.M. Rad, J. Huang, M. Chiang and V.S.S. Wong, "Utility-optimal random access without message passing," IEEE Trans. on Wireless Commun., vol. 8, No. 3, Mar. 2009.

G. Auer, S. Videv, B. Ghimire, and H. Haas, "Contention free intercellular slot reservation," IEEE Communication Letters, vol. 13, No. 5, pp. 318-320, May 2009.

R.A. Valenzuela, S.J. Fortune, and J. Ling, "Indoor prediction accuracy and speed versus number of reflections in image-based 3-D ray-tracing," in Proc of IEE VTC, May 1998.

B. Neekzad, K. Sayrafian-Pour, J. Perez, and J.S. Baras, "Comparison of ray-tracing simulations and millimeter wave channel sounding measurements," in Proc. of IEEE PIMRC, 2007.

S. Sesia, I, Toufik, and M. Baker, *LTE The UMTS Long Term Evolution*, New York, Wiley, 2009, p. 308.

* cited by examiner 110A
110B
120A
120B
110C
120C

DISTRIBUTED MEDIUM ACCESS CONTROL FOR WIRELESS DATA NETWORKS

BACKGROUND

1. Field

An example embodiment relate generally to scheduling transmissions in a wireless network.

2. Related Art

Cellular networks provide wireless communication for mobile devices via base stations. A wireless network can include multiple base stations each exchanging wireless data with mobile devices simultaneously. Cellular networks typically operate with full reuse which includes each base station transmitting data simultaneously on the same time slots. However, another way to operate the cellular system is to schedule time slots.

SUMMARY

According to an example embodiment, a method of scheduling a data transmission in a current time frame in a wireless network including a first node and a plurality of second nodes may include identifying conflicts by sending and announcement message from the first node to neighboring nodes from among the plurality of second nodes indicating that the first node intends to participate in a first communication with a first terminal during the current frame, and receiving a report message from any conflicting nodes at the first node, each conflicting nodes being a node from among the neighboring nodes which intends to participate in a different communication. Conflicts may be resolved by selecting one of (1) maintaining a state of the first node as a clear state and (2) changing the state of the first node to a blocked state based on the received report messages; and scheduling the first communication for the current time frame, if the state of the first node is the clear state after the resolving conflicts step.

The first communication may be a downlink communication, and the different communication may be a downlink communication.

Each received report message may include an indication of the conflicting node corresponding to the received report message and a priority value associated with the corresponding conflicting node. The resolving conflicts step may include determining whether a priority value of the first node is less than any of the priority values of the conflicting nodes, and changing the state of the first node to a blocked state if the determination indicates the priority value of the first node is less than any of the priority values of the conflicting nodes.

The resolving conflicts step may further include a clear determination operation including sending a first outgoing status message from the first node to the neighboring nodes indicating the status of the first node, receiving a first incoming status message from any conflicting nodes, each incoming status message indicating a status of one of the conflicting nodes, if the state of the first node is the clear state, maintaining the state of the first node, and if the state of the first node is the blocked state, selecting one of (1) maintaining the state of the first node as the blocked state and (2) changing the state of the first node to the clear state based on the received first incoming messages. The resolving conflicts step may also include a block determination operation including sending a second outgoing status message from the first node to the neighboring nodes indicating the status of the first node, receiving a second incoming status message from any conflicting nodes, each second incoming status message indicating a status of one of the conflicting nodes, if the state of the first node is the blocked state, maintaining the state of the first node, and if the state of the first node is the clear state, selecting one of (1) maintaining the state of the first node as the clear state and (2) changing the state of the first node to the blocked state based on the received second incoming status messages.

The resolving conflicts step may further include repeating the clear determination and block determination operations a reference number of times.

If the state of the first node is the blocked state at a beginning of the clear determination operation, the clear determination operation may include changing the state of the first node to the clear state if the received first incoming status messages indicate the statuses of all the conflicting nodes are the blocked state.

If the state of the first node is the clear state at a beginning of the block determination operation, the block determination operation may include changing the state of the first node to the blocked state if any of the received first incoming status messages indicate the status of one of the conflicting nodes having a priority value greater than the priority value of the first node is the clear state.

The first communication may be an uplink communication, and the different communication may be an uplink communication.

The received report message may include an indication of the conflicting node corresponding to the received report message and a priority value associated with the corresponding conflicting node. The resolving conflicts step may include determining whether a priority value of the first node is less than any of one or more priority values of the conflicting nodes, and changing the state of the first node to a blocked state if the determination indicates the priority value of the first node is less than any of the one or more priority values of the conflicting nodes.

The resolving conflicts step may further include a clear determination operation including sending a first outgoing status message from the first node to the neighboring nodes indicating the status of the first node, receiving a first incoming status message from any conflicting nodes, each first incoming status message indicating a status of one of the conflicting nodes, if the state of the first node is the clear state, maintaining the state of the first node, and if the state of the first node is the blocked state, selecting one of (1) maintaining the state of the first node as the blocked state and (2) changing the state of the first node to the clear state based on the received first incoming messages. The resolving conflicts step may further include a block determination operation including sending a second outgoing status message from the first node to the neighboring nodes indicating the status of the first node, receiving a second incoming status message from any conflicting nodes, each received second incoming status message indicating a status of one of the conflicting nodes, if the state of the first node is the blocked state, maintaining the state of the first node, and if the state of the first node is the clear state, selecting one of (1) maintaining the state of the first node as the clear state and (2) changing the state of the first node to the blocked state based on the received second incoming status messages.

The resolving conflicts step may further include repeating the clear determination and block determination operations a reference number of times.

If the state of the first node is the blocked state at a beginning of the clear determination operation, the clear determination operation may include changing the state of the first node to the clear state if the received first incoming status messages indicate the statuses of all the conflicting nodes are the blocked state.

If the state of the first node is the clear state at a beginning of the block determination operation, the block determination operation may include changing the state of the first node to the blocked state if any of the received first incoming status messages indicate the status of one of the conflicting nodes having a priority value greater than the priority value of the first node is the clear state.

The first node may select one or more nodes from the plurality of second nodes as the neighboring nodes based on signal parameters of each of the second nodes.

The signal parameters may include at least one of one of a signal-to-interference ratio (SIR) and a signal strength measured by the first terminal.

The first and second nodes may be access points (APs), and the first terminal may be a user equipment (UEs).

According to an example, embodiment, a network apparatus for providing supporting wireless communications of a user equipment (UE) in a wireless communications network including a plurality of network nodes may include a receiver unit configured to receive data from the UE and one or more of the plurality of network nodes; a transmitting unit configured to transmit data to the UE and one or more of the plurality of network nodes; a memory unit configured to store parameters corresponding with characteristics of one or more of the plurality of network nodes; and a processing unit coupled to the transmitting unit, the receiving unit, and the memory unit and configured to control operations associated scheduling a data transmission operation with the UE. The operation may include identifying conflicts by sending and announcement message to neighboring nodes from among the plurality of network nodes indicating that the network apparatus intends to participate in a first communication with the UE during a current frame, and receiving a report message from any conflicting nodes, the each conflicting node being a node from among the neighboring nodes which intends to participate in a different communication; resolving conflicts by selecting one of (1) maintaining an internal state as a clear state and (2) changing the internal state to a blocked state based on the received report messages, and scheduling the first communication for the current time frame, if the internal state is the clear state after the resolving conflicts step.

BRIEF DESCRIPTION OF THE DRAWINGS

An example embodiment will become more fully understood from the detailed description provided below and the accompanying drawings, wherein like elements are represented by like reference numerals, which are given by way of illustration only and thus are not limiting of example embodiments and wherein.

DETAILED DESCRIPTION OF EXAMPLE EMBODIMENTS

Figure 1A:
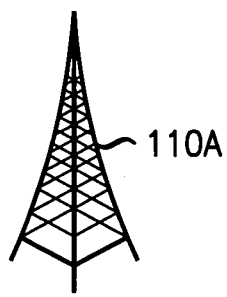
FIG. 1A is a diagram illustrating a portion of a wireless network according to an example embodiment.
Figure 1A:
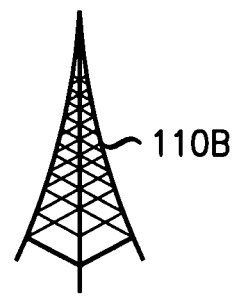
Figure 1A:
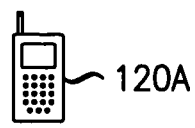
Figure 1A:
Figure 1A:
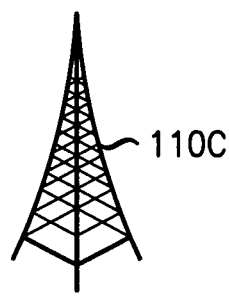
Figure 1A:

Various an example embodiment will now be described more fully with reference to the accompanying drawings in which some example embodiments are shown.

Detailed illustrative embodiments are disclosed herein. However, specific structural and functional details disclosed herein are merely representative for purposes of describing an example embodiment. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term user equipment (UE) may be considered synonymous to, and may hereafter be occasionally referred to, as a terminal, mobile unit, mobile station, mobile user, access terminal (AT), subscriber, user, remote station, access terminal, receiver, etc., and may describe a remote user of wireless resources in a wireless communication network. The term access point (AP) may be considered synonymous to and/or referred to as a base transceiver station (BTS), NodeB, extended Node B (eNB), femto cell, base station (BS), etc. and may describe equipment that provides the radio baseband functions for data and/or voice connectivity between a network and one or more users.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

The program modules and functional processes discussed herein may be implemented using existing hardware in existing communication networks. For example, program modules and functional processes discussed herein may be implemented using existing hardware at existing network elements or control nodes (e.g., an AP shown in FIG. 1). Such existing hardware may include one or more digital signal processors (DSPs), application-specific-integrated-circuits, field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

When multiple access points (APs) in the same geographic region communicate with users simultaneously, the APs may interfere with one another resulting in reduced signal quality and or data throughput. In small cell networks, access points (AP) will serve relatively few users as compared to macrocells, thus the radio frequency (RF) transmit power will be closely related to the traffic loading. Other characteristics of small cells are short range, low delay spread, and low mobility. These permit signal strength feedback of neighboring interferers to be performed at low rate, and make inter-AP coordination more feasible.

An example embodiment provide method and apparatus for implementing a distributed media access control process for scheduling wireless data transmissions between APs and corresponding user equipment UEs on channels of a wireless network including multiple APs in a manner which reduces interference between the different APs and UEs. An example network in which the method of scheduling transmissions according to an example embodiment may be used will now be discussed with respect to FIG. 1A.

FIG. 1A illustrates a portion of a wireless network 100. The wireless network 100 may be, for example, a small area network within a larger cellular network situated, for example, in a office building or a group of city blocks. The wireless network 100 includes first through third APs 110A-110B. Though only three APs are illustrated in FIG. 1, the wireless network 100 may include any number of APs.

First through third UEs 120A-120B are UEs within a geographical area covered by the wireless network 100. APs within the wireless network 100 may support communication of data between the wireless network 100 and a UEs within the geographical area covered by the wireless network 100 via wireless links between the APs and the UEs. For example, the first through third APs may support wireless communication between the first through third UEs 120A-120B and the rest of the wireless network 100 via wireless data links between the first through third APs 110A-110B and the first through third UEs 120A-120B. Further, APs within the wireless network 100 are capable of communicating control information to one another via control channels. An overview of the method for scheduling transmissions of wireless data according to an example embodiment will now be discussed below with reference to FIG. 1A.

Figure 1B:
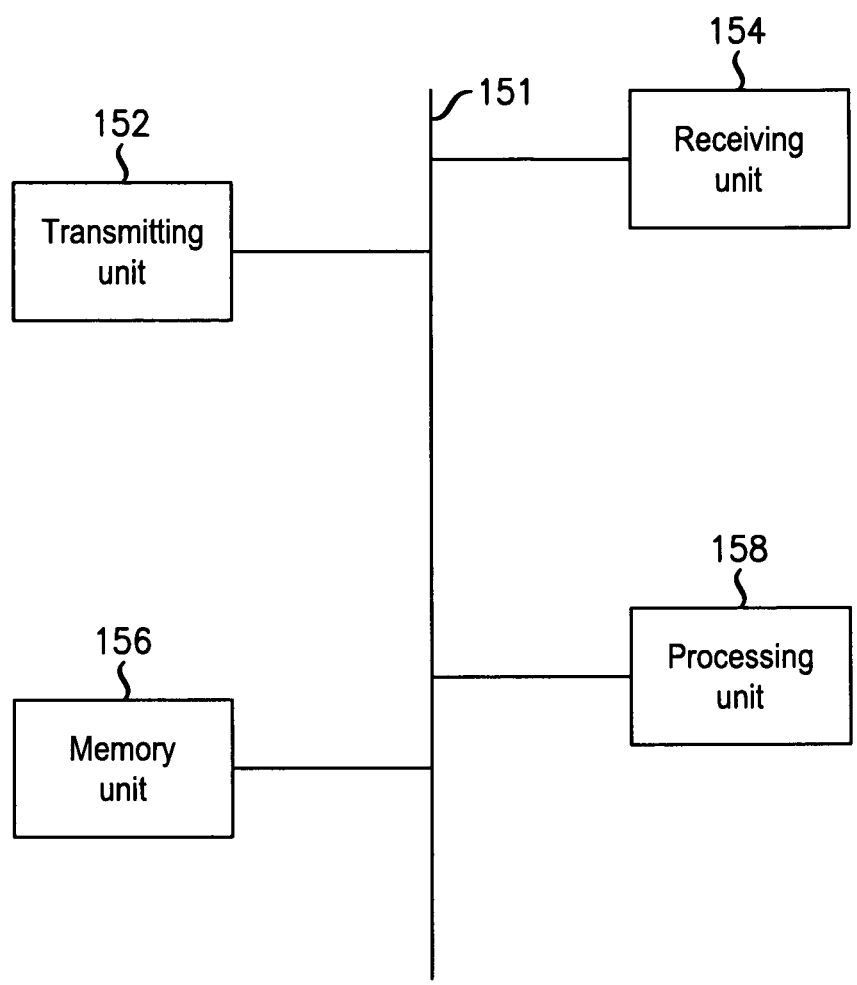
FIG. 1B is a diagram illustrating an example structure of a network apparatus according to an example embodiment.

Overview of Method and Apparatus for Scheduling Data Transmissions in a Wireless Network FIG. 1B is a diagram illustrating an example structure of the first AP 110A according to an example embodiment. Referring to FIG. 1B, the first AP 110A may include, for example, a data bus 151, a transmitting unit 152, a receiving unit 154, a memory unit 156, and a processing unit 158. The transmitting unit 152, receiving unit 154, memory unit 156, and processing unit 158 may send data to and/or receive data from one another using the data bus 151. The transmitting unit 152 is a device that includes hardware and any necessary software for transmitting wireless signals including, for example, data signals, control signals, and signal strength/quality information via one or more wireless connections to other network elements in the wireless network 100. The receiving unit 154 is device that includes hardware and any necessary software for receiving wireless signals including, for example, data signals, control signals, and signal strength/quality information via one or more wireless connections to other network elements in communications network 100. The memory unit 156 may be any device capable of storing data including magnetic storage, flash storage, etc. The processing unit 158 may be any device capable of processing data including, for example, a microprocessor configured to carry out specific operations based on input data, or capable of executing instructions included in computer readable code. For example, the processing unit 158 is capable of performing signal strength/quality estimates based on signal strength/quality indicators received from a UE or an AP, and performing comparisons based on the signal strength/quality estimates. Though, for the purpose of simplicity, only the first AP 110A is illustrated in FIG. 1B, other APs in the communications network 100 may have the same structure as the first AP 110A. An example method for operating the first AP 110A will be discussed in greater detail below with reference to FIGS. 2A and 2B.

Figure 2A:
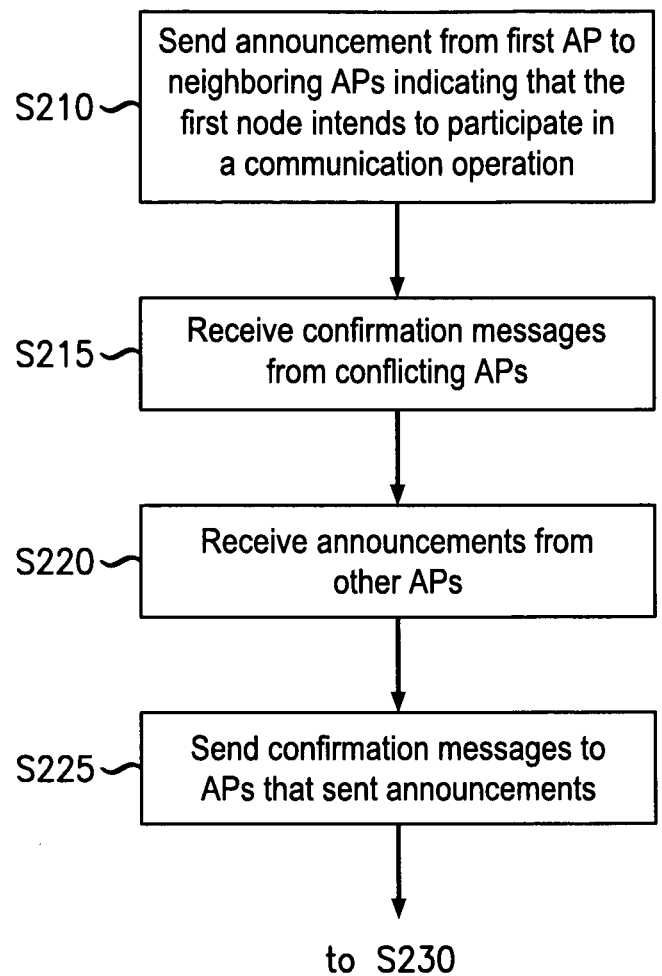
FIGS. 2A and 2B are flow charts illustrating a method of scheduling transmissions according to an example embodiment
Figure 2B:
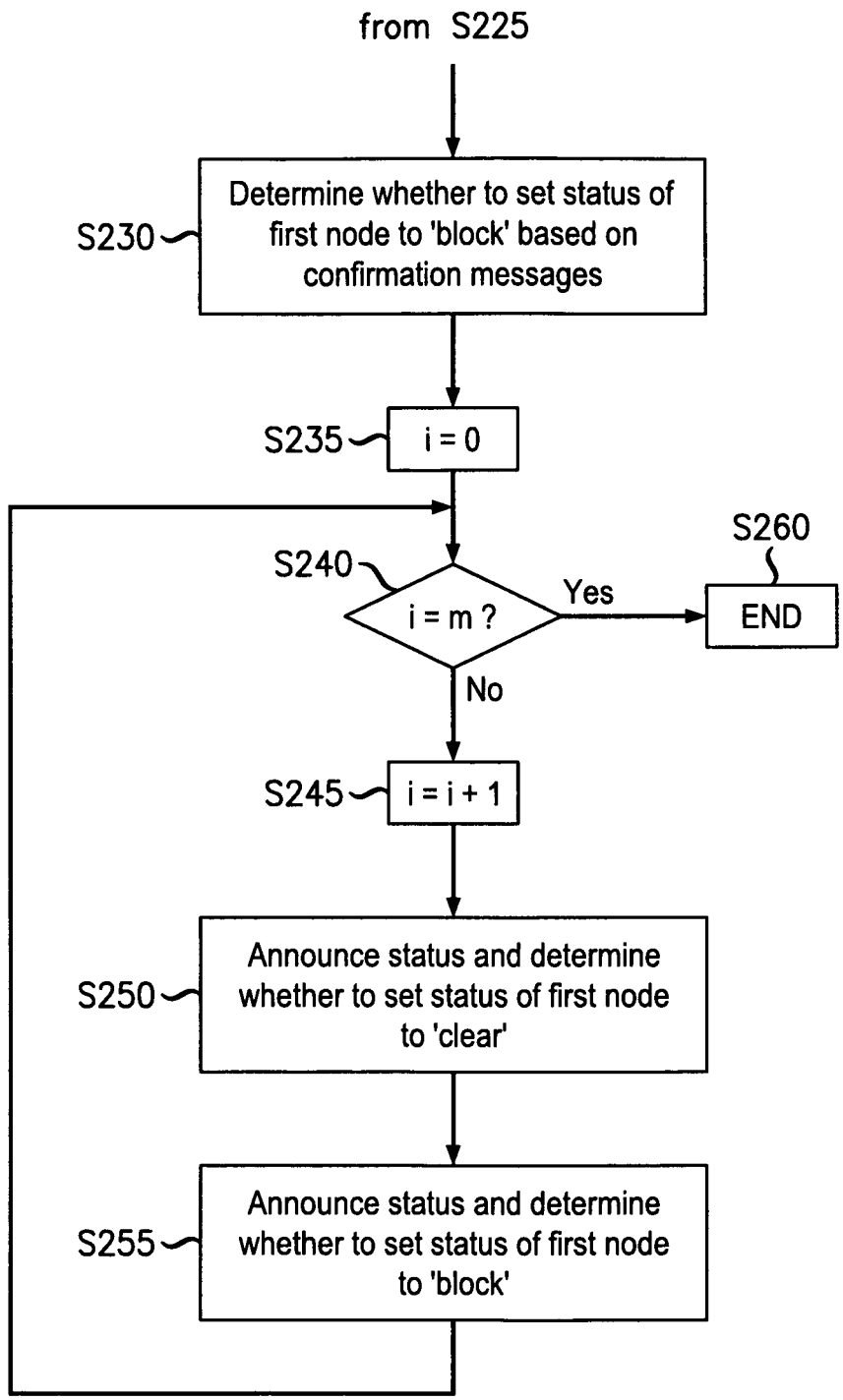

FIGS. 2A and 2B are flow charts illustrating a method of scheduling transmissions according to an example embodiment.

The method of scheduling transmission according to an example embodiment may be performed in the wireless network 100 during every time slot for both uplink transmissions from UEs to APs, and downlink transmissions from APs to UEs. In the case of downlink transmissions, APs having data to send to UEs are referred to as transmitters R, and UEs which are the targets of that data are referred to as destinations D. In the case of uplink transmissions, UEs having data to send are referred to as the transmitters R, and APs which are the targets of the data are referred to as the destinations D.

A goal of the method of scheduling transmissions according to an example embodiment is to obtain from the set of transmitters, R, a set of non-colliding transmitters R*. Accordingly, $R^* \subseteq R$. Collisions may be defined as instances where, during a given time slot, a transmission of one transmitter interferes with the reception of a transmission of at least one other transmitter beyond a threshold value. Accordingly, the set R* includes only transmitters within the wireless network 100 which can transmit data to intended destinations during the same time slot without causing more than a threshold amount of interference for one another with respect to the receipt of the transmitted data at any of the intended destinations.

As is discussed above, the method of scheduling transmission according to an example embodiment may be distributed, and thus, scheduling decisions may be made individually by APs within the wireless network 100 instead of a central controller. In order to form the non-colliding set of transmitters R* in a distributed manner, each AP makes its own determination regarding whether or not it can send (in the case of a downlink transmission) or receive (in the case of an uplink transmission) data during the current time frame. In order to achieve this, according to example embodiments, the method of scheduling transmissions according to an example embodiment can be divided into two basic portions (1) conflict identification, which will be explained with reference to steps S210-S225 in FIG. 2A; and (2) conflict resolution, which will be explained with reference to steps S230~S260 in FIG. 2B.

With respect to identifying conflicts, a conflict exists when two or more APs intend to participate in the same type of data transmission operation (uplink or downlink) during the same time slot, and at least one of the intended data transmissions would cause a collision. As will be discussed in greater detail below with reference to FIG. 2A, APs in the wireless network 100 having data to receive in an uplink transmission during a given time slot determine whether any conflicts exist with respect to other APs in the wireless network 100 that have data to receive in the same time slot. Similarly, APs in the wireless network 100 having data to transmit in a downlink transmission during a given time slot determine whether any conflicts exist with respect to other APs in the wireless network 100 that have data to transmit in the same time slot.

With respect to resolving conflicts, as will be discussed in greater detail below with reference to FIG. 2B, after APs in the wireless network 100 having data to send in a downlink transmission or data to receive in an uplink transmission identify conflicts represented by other APs sending or transmitting data during the same time slot, the APs determine whether to set themselves to a 'clear' state or a 'blocked' state. The 'clear' state is a state in which an AP can send data in a downlink transmission or receive data in an uplink transmission, and is the initial state of all APs in the wireless network 100. The 'blocked' state is a state in which an AP does not send data in a downlink transmission or receive data in an uplink transmission. As will be discussed in greater detail below, during the conflict resolution portion of the method of scheduling transmissions according to an example embodiment, each AP chooses how to set its state based on an evaluation of characteristics of its neighboring APs. The process of evaluating neighboring APs and setting the state based on the evaluation may be performed multiple times. Once the conflict resolution portion is complete, each AP in the wireless network 100 will have determined its own state as 'clear' or 'blocked', and the APs throughout the wireless network 100 can schedule transmissions of uplink or downlink for the current time slot without collisions.

Examples of the conflict identification and conflict resolution portions of the method of scheduling transmissions will now be discussed in greater detail below with reference to FIGS. 2A and 2B. FIGS. 2A and 2B will be described from the point of view of the first AP 110A in the wireless network 100 illustrated in FIG. 1A. With respect to the present example description, it is assumed the first UE 120A is associated with the first AP 110A, and the first AP 110A intends to participate in either an uplink data transmission or a downlink data transmission with the UE 120A. Further, according to an example embodiment, each of the steps illustrated in FIGS. 2A and 2B may be performed by, for example, the first AP 110A structured as illustrated in FIG. 1B, where the memory unit 156 may store executable instructions corresponding to each of the operations illustrated in FIGS. 2A and 2B. The processor unit 158 is configured perform operations corresponding to each of the operations illustrated in FIGS. 2A and 2B. According to an example embodiment, transmitted data and/or control signals may be transmitted through the transmitting unit 152, and received data and/or control signals may be received through the receiving unit 154.

Conflict Identification

In step S210, the first AP 110A sends an announcement message to neighboring APs indicating that the first AP 110A intends to participate in a data communication operation. For example, in the case of a downlink operation, the first AP 110A may send an announcement message to neighboring APs of the first AP 110A as an indication to the neighboring APs that the first AP 110A intends to send data to the first UE 110 during the current time slot. For example, the first AP 110A may determine that second and third APs 120A and 120B are neighboring nodes and send announcement messages to second and third APs 120A and 120B. The announcement message may include, for example, information indicating the AP sending the announcement.

Similarly, in the case of an uplink transmission, the first AP 110A may send an announcement message to neighboring APs of the first AP 110A as an indication that the first AP 110A intends to receive data transmitted by the first UE 110A.

For downlink transmission, neighboring APs are APs within the wireless network 100 whose own transmissions may interfere with the reception at the first UE 110 of data sent by the first AP 110A if made during the same time slot. For uplink transmissions, neighboring APs are APs within the wireless network 100 associated with UEs whose transmissions may interfere with the reception by the first AP 110 of data transmitted from the first UE 110 to the first AP 110A if made during the same time slot.

The operation of determining which APs are neighboring APs may be performed before the method illustrated in FIGS. 2A and 2B begins. APs within the wireless network 100 may determine which APs are neighboring APs based on signal quality information associated with the APs. UEs in the wireless network 100 are configured to monitor signal quality values of APs within range of the UEs, and to report the monitored signal quality information to the APs the UEs are associated with. The reported signal quality information may be based on, for example, signal strengths or signal-to-interference (SIR) values. Accordingly, APs can determine a set of neighboring APs based on signal quality information received from associated UEs. For example, the first UE 120A may monitor the signal strength of APs in range of the UE 120A and report to the first AP 110A the strongest APs monitored by the first UE 120A, and the first AP 110A can set the n strongest APs reported by the first UE 120A as the neighboring nodes.

According to example embodiments, the number of neighboring APs can be adjusted by adjusting the criteria used to choose the neighboring nodes. For example, the first AP 110A may increase or decrease the value n to designate more or less of the strongest APs monitored by the first UE 120A as neighboring APs. Increasing the number of neighbors may reduce interference, improving a data rate for transmitting APs, but may also reduce the overall number of transmissions which can be made by APs simultaneously in a single time slot per unit area, which may reduce overall throughput for APs in a given area since fewer APs will be able to transmit.

Further, as will be explained in greater detail below with reference to the conflict resolution operation described in FIG. 2, in accordance with an example embodiment of the method of scheduling transmissions, an AP does not schedule a data transmission operation for the same time slot as one of its neighboring APs because such an action would result in a collision and, according to an example embodiment, the data transmission scheduling method schedules data transmissions in such a manner that collisions are eliminated or reduced. Accordingly, for example, by defining the neighboring APs of the first AP 110A as APs which will cause more than a threshold amount of interference with respect to the intended data transmission operation of the first AP 110A, the first AP 110A can help ensure that its data transmission operation will not experience more than the threshold amount of interference if performed during the current time frame.

After sending the announcement message in step S210, the first AP 110A proceeds to step S215.

In step S215, confirmation messages are received from conflicting APs. For example, the first AP 110A may receive one or more confirmation messages from conflicting APs in response to the announcement message sent in step S210.

In the case of downlink transmission, conflicting APs are neighboring APs which actually intend to send data, during the same time slot as the AP that sent the announcement message, and thus, represent conflicts which must be resolved in order to achieve collision free data transmission. According to example embodiments, after an AP sends announcement messages to neighboring APs, each of the neighboring APs which also have data to transmit during the current time slot respond with a confirmation message. The confirmation message may include, for example, information identifying the AP sending the confirmation message. Neighboring APs who do not have data to send during the current time slot do not send confirmation messages. Because only neighboring APs who also intend to send data during the current time slot respond with conflict messages, the AP receiving the confirmation messages can define the neighboring APs which sent conformation messages as its conflicting APs.

Similarly, in the case of uplink transmission, conflicting APs are neighboring APs which actually intend to receive data transmitted by a corresponding UE, during the same time slot as the AP that sent the announcement message, and thus, represent conflicts which must be resolved in order to achieve collision free data transmission. According to example embodiments, after an AP sends announcement messages to neighboring APs, each of the neighboring APs, which also have data to receive during the current time slot respond with a confirmation message. The confirmation message sent in the uplink case may include, for example, information identifying the AP sending the confirmation message and an estimate of the interference caused if transmission is allowed by UEs corresponding to the neighboring APs. APs sending announcement messages can use the interference estimate as further criteria in determining whether other APs should be considered neighboring APs. For example, neighboring APs whose corresponding UEs would cause less than the reference amount of interference may be removed from the list of neighboring APs. Neighboring APs who do not have corresponding UEs transmitting data to them during the current time slot do not send confirmation messages. Because only neighboring APs who also intend to receive data during the current time slot respond with conflict messages, the AP receiving the confirmation messages can define the neighboring APs which sent conformation messages as its conflicting APs.

For example, for a downlink transmission, if the second AP 110B has data to send during the current time slot and the third AP 110C does not, in response to announcement messages sent by the first AP 110A in step S210, the second AP 110B sends an confirmation message to the first AP 110A and the third AP 110C does not send a confirmation message to the first AP 110A. For an uplink transmission, if the second AP 110B has data to receive during the current time slot and the third AP 110C does not, in response to announcement messages sent by the first AP 110A in step S210, the second AP 110B sends a confirmation message to the first AP 110A and the third AP 110C does not send a confirmation message to the first AP 110A.

Accordingly, as is discussed above, by sending announcement messages and receiving confirmation messages in steps S210 and S215, the first AP 110A is able to identify which of the other APs within the wireless network 100 represent conflicts with respect to its intended operation of transmitting or receiving data to the first UE 120A during the current time frame. Further, though the first AP 110A is described above as determining conflicting APs based on confirmation messages received in step S215, the first AP 110A may also determine conflicting APs based on announcements messages received in step S220.

Additionally, the first AP 110A must do its part in allowing other APs within the wireless network to identify their own conflicts. This will be discussed in greater detail below with respect to steps S220 and S225.

In step S220, announcement messages are received from other APs. For example, the first AP 110A may receive announcement messages from other APs within the network 100 which have data to send or receive during the current time slot and have designated the first AP 110A as a neighboring AP.

In step S225, confirmation messages are sent to the APs that sent the announcement messages. As is discussed above with respect to step S215, APs that intend to transmit or receive data during the current time slot and receive an announcement message indicating that another AP intends to participate in the same type of operation (uplink or downlink) during the same time slot respond to the announcement messages with confirmation messages.

Accordingly, for example, in the case of a downlink transmission, since the first AP 110A intends to transmit data to the first UE 120A during the current time slot, the first AP 110A responds to each of the announcement messages indicating an intent to send data during the current time slot received in step S220 by sending confirmation messages to each of the APs that sent the announcement messages. In the case of an uplink transmission, since the first AP 110A intends to receive data transmitted from the first UE 120A during the current time slot, the first AP 110A responds to each of the announcement messages indicating an intent to receive data during the current time slot received in step S220 by sending confirmation messages to each of the APs that sent the announcement messages.

Though steps S220 and S225 are illustrated as being performed after step S210 and S215, according to an example embodiment, steps S210 and S215 may be performed before or in parallel with steps S220 and S225.

Once the conflicts have been identified by APs within the wireless network 100, the conflicts can be resolved. The conflict resolution portion of the method of scheduling transmissions according to an example embodiment will now be discussed below with reference to FIG. 2B.

Conflict Resolution

In step S230, the first AP 110A determines whether or not to set the state of the first AP 110A to a 'blocked' state.

As is discussed above, APs in the wireless network 100 begin with a 'clear' state in which the APs can transmit data to a UE or receive data from a UE. With respect to the 'blocked' state, APs having a 'blocked' state do not transmit data to their corresponding UEs in the case of a downlink transmission, and UEs corresponding to APs having a 'blocked' state do not transmit data to the UEs in the case of an uplink transmission. In order to increase the fairness with which the transmissions of APs within the network 100 are scheduled, a priority number (PN) of each AP is determined by a pseudo-random sequence, and the PN is used to determine whether an AP changes its state from a 'clear' state to a 'blocked' state.

For example, in step S230, the first AP 110A may compare its own PN to the PNs of the conflicting APs identified in step S215, and the first AP 110A may set its state to 'blocked' if any of the PNs of the conflicting APs is greater than the PN of the first AP 110A. If none of the PNs of the conflicting nodes is greater than the PN of the first AP 110A, the first AP 110A may maintain its initial 'clear' state.

The first AP 110A may receive the PNs of the conflicting APs in the confirmation messages sent by the conflicting APs and received by the first AP 110A in step S215. Additionally, seeds used in the pseudo random generation of PNs for each of the ANs in the wireless network 100 may be stored in a central database such that the first AP 110A can obtain the seeds and calculate the PNs of the conflicting nodes without needing to receive the PNs from the conflicting nodes.

As is discussed above, including the use of pseudo random priority values like the PNs increases the fairness with which transmissions of the APs within the wireless network 100 are scheduled. However, in a case where one or more APs within the wireless network 100 are more heavily loaded than others, the assignment of PNs based on the pseudorandom sequence in the manner discussed above may not be fair. In order to address this situation, the PN of each AP may be determined based on a pseudorandom sequence and, for example, a number of UEs attached to the AP such that, for a given AP, an expected outcome of the pseudorandom process which generates the PN of the AP may increase with the number of UEs attached to the AP.

After the first AP 110A determines whether or not to change its state to the 'blocked' state, the first AP 110A proceeds to step S235.

In step S235 an index value, i, is initialized to, for example, 0. In step S240, the index value i is compared to a threshold value, M.

If the index value i equals the threshold value M, the first AP 110A proceeds to step S260 and the method of scheduling transmissions according to an example embodiment ends. At this point, if the state of the first AP 110A is 'clear', the first AP 110A schedules itself to send data to the first UE 110A during the current time slot in the case of a downlink operation, or to receive data from the first UE 110A during the current time slot in the case of an uplink operation. If the state of the first AP 110A is 'blocked' when the method illustrated in FIGS. 2A and 2B end, the first AP 110A does not send data to the first UE 110A during the current time slot in the case of a downlink operation, or receive data from the first UE 110A during the current time slot in the case of an uplink operation.

If the index value i does not equal the threshold value M, the first AP 110A proceeds to step S245 and increments the index value i.

Figure 3A:
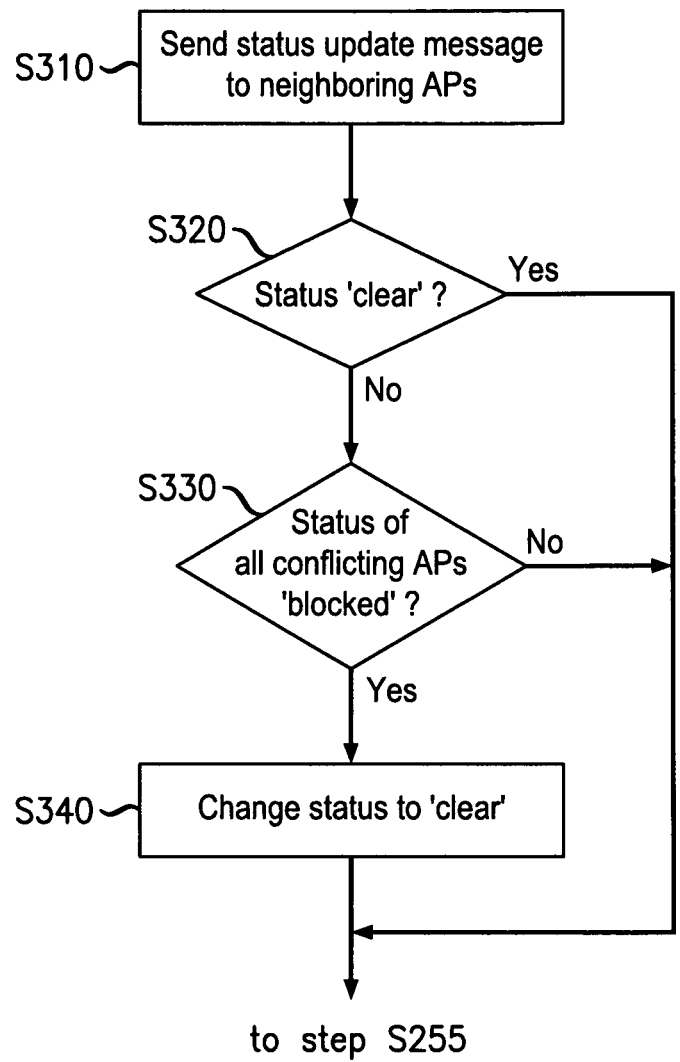
FIGS. 3A and 3B are flowcharts illustrating the method of FIG. 2B in greater detail.

In step S250, the first AP 110A announces its current state and determines whether or not to change its state to 'clear'. FIG. 3A is a flow chart illustrating an example of step S250 in greater detail.

Referring to FIG. 3A, in step S310 the first AP 110A announces its current state by sending a state update message indicating the current state of the first AP 110A to the neighboring APs of the first AP 110A.

According to at least one example embodiment, if the state of the first AP 110A has not changed since the last time the first AP 110A sent a state update message, the first AP 110A may not send a state update message during step S310 and may proceed directly to step S320.

In step S320, the first AP 110A determines if its current state is already 'clear'. If the state of the first AP 110A is already 'clear', the first AP 110A maintains its current state and proceeds to step S255. If the state of the first AP 110A is not 'clear', the state of the first AP 110A is 'blocked' and the first AP 110A proceeds to step S330.

In step S330, the first AP 110A evaluates the states of the conflicting nodes of the first AP 110A. The AP 110A may determine states of the conflicting nodes based on state update messages received by the first AP 110A from the conflicting nodes. If at least one of the states of the conflicting nodes of the first AP 110A is 'clear', the first AP 110A maintains its state as 'blocked' and proceeds to step S255. If all of the states of the conflicting nodes of the first AP 110A are 'blocked', the first AP 110A proceeds to step S340.

In step S340, the first AP 110A changes its state from 'blocked' to 'clear' and proceeds to step S255.

Figure 3B:
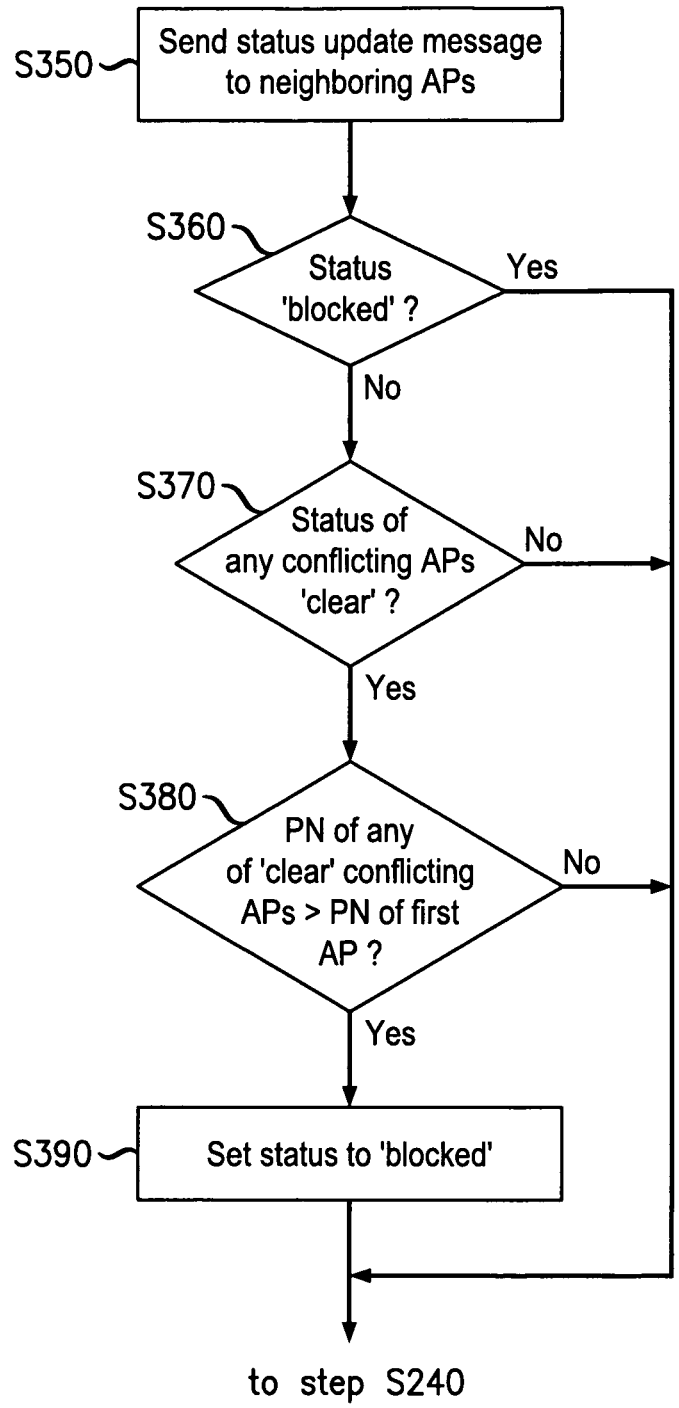

In step S255, the first AP 110A announces its current state and determines whether or not to change its state to 'blocked'. FIG. 3B is a flow chart illustrating an example step S250 in greater detail.

Referring to FIG. 3B, in step S350 the first AP 110A announces its current state by sending a state update message indicating the current state of the first AP 110A to the neighboring APs of the first AP 110A.

According to at least one example embodiment, if the state of the first AP 110A has not changed since the last time the first AP 110A sent a state update message, the first AP 110A may not send a state update message during step S350 and may proceed directly to step S360.

In step S360, the first AP 110A determines if its current state is already 'blocked'. If the state of the first AP 110A is already 'blocked', the first AP 110A maintains its current state and proceeds to step S255. If the state of the first AP 110A is not 'blocked', the state of the first AP 110A is 'clear' and the first AP 110A proceeds to step S370.

In step S370, the first AP 110A evaluates the states of the conflicting nodes of the first AP 110A. The AP 110A may determine states of the conflicting nodes based on state update messages received by the first AP 110A from the conflicting nodes. If none of the states of the conflicting nodes of the first AP 110A is 'clear', the first AP 110A maintains its state as 'clear' and proceeds to step S240. If any of the states of the conflicting APs is 'clear', the first AP 110A proceeds to step S380.

In step S380, the first AP evaluates the PNs of conflicting APs having 'clear' states. If none of the conflicting APs having a 'clear' state have a PN greater than the PN of the first AP 110A, the first AP 110A maintains its state as 'clear' and proceeds to step S240. If any of the conflicting APs having a 'clear' state has a PN greater than the PN of the first AP 110A, the first AP 110A proceeds to step S390.

In step S390, the first AP 110A changes its state from 'clear' to 'blocked' and proceeds to step S240.

In step S240, the first AP 110A determines whether or not to perform steps S245~S255 again based on a comparison of the index i to the threshold value M. Accordingly, as is illustrated in FIG. 2A, the number of times steps S240~S255 are repeated may be controlled by the threshold value M.

Referring back to the steps S210~S225 illustrated in FIG. 2A, the first AP 110A sends two messages, an announcement message in step S210 and a confirmation message in step S225. Referring to steps S230-S260, the first AP 110A sends two messages, state update messages in each of steps S250 and S255. Because steps S250 and S255 are repeated a number of times equal to the threshold value M, a number of messages sent by the first AP 110A when performing the method illustrated in FIGS. 2A and 2B for one time frame may be defined as 2+2M. Accordingly, for larger M, the utilization of the APs within the wireless network 100 rises, but so does the necessary exchange of messages between neighboring APs. When M=0, the utilization obtained is the lowest. However, even when M=0, after the first block step S230, the APs of the wireless network 100 may transmit downlink data or receive uplink data without collisions. Though, for the purpose of simplicity, the operations discussed above re discussed with reference to the first AP 110A, any or all APs in the communications network 100, including for example first and second APS 110B and 110C, may be configured to perform the operation discussed above with reference to the first AP 110A. The relationship between utilization and the threshold value M will be discussed in greater detail below with reference to FIG. 4.

Figure 4:
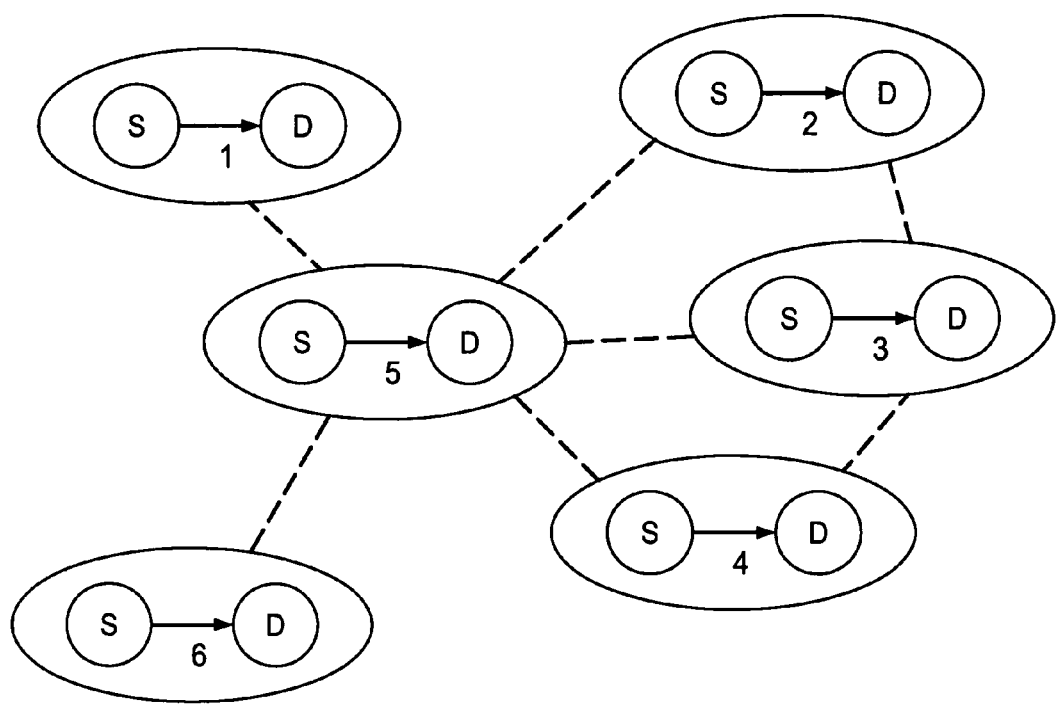
FIG. 4 is a diagram illustrating a portion of a wireless network according to an example embodiment.

FIG. 4 illustrates a portion of a wireless network 200. Wireless network 200 includes first through sixth AP-UE pairs 1-6. Each of the first through sixth pairs includes a transmitting AP, S, and a receiving UE, D. Conflicts between APs of the first through sixth pairs 1-6 are indicated by the dotted lines illustrated between the first through sixth pairs 1-6. An example of the iterative steps S240 through S255 illustrated in FIG. 2B being performed by each of the first through sixth pairs 1-6 will now be discussed with reference to FIG. 4.

In the present example, it is assumed that APs of each of the first through sixth pairs 1-6 has a PN equal to its reference numeral. For example, the AP of the first pair 1 has a PN of 1, the AP of the second pair 2 has a PN of 2, etc. Further, it is assumed that steps S210~S225 illustrated in FIG. 2A and step S230 illustrated in FIG. 2B have already been performed. Accordingly, the APs of the first through fifth pairs 1-5 have already blocked themselves because each has a conflicting AP with a higher PN.

In a first iteration of step S250, APs of the first through fifth pairs 1-5 announce their states as 'blocked', and the AP of the $6^{th}$ pair announces its state as 'clear'. APs of the first through fourth pairs 1-4 then clear themselves because for each, all of their conflicting APs have a state of 'blocked'. The AP of the sixth pair 6 does nothing because it already has a 'clear" state. The AP of the fifth pair 5 maintains its 'blocked' state because at least one of its conflicting APs has a 'clear' state.

In a first iteration of step S260, APs of the first through fourth, and sixth pairs 1-4 and 6 announce their states as 'clear', and the AP of the fifth pair announces its state as 'blocked'. APs of the second and third pairs 2 and 3 then set their states to 'blocked' because for each, at least one of their conflicting APs have a state of 'clear' and a greater PN. The AP of the fourth pair 4 does nothing because its PN is greater than that of its conflicting APs having 'clear' states, and thus, it maintains its 'clear' state. The APs of the first and sixth pairs 1 and 6 do nothing because for each, all their conflicting APs have a 'blocked' state. The AP of the fifth pair 5 does nothing because it already has a 'blocked' state.

After the first iteration of steps S250 and S260, the number of 'clear' APs increases from one (AP of the $6^{th}$ pair 6 before first iteration) to three (APs of the first, fourth and sixth pairs 1, 4 and 6 after first iteration).

In a second iteration of step S250, APs of the first, fourth and sixth pairs 1, 4 and 6 announce their states as 'clear' and APs of the second, third and fifth pairs 2, 3 and 5 announce their states as 'blocked'. The AP of the second pair 2 then sets its state to 'clear' because all its conflicting APs have a 'blocked' state. The APs of the first, fourth and sixth pairs 1, 4 and 6 do nothing because each of their states are already set to 'clear'. The APs of the third and fifth pairs 3 and 5 maintain their 'blocked' states because, for each, at least one of their conflicting APs has a 'clear' state.

In the second iteration of the step S260, APs of the first, second, fourth and sixth pairs 1, 2, 4 and 6 announce their states as 'clear' and APs of the third and fifth pairs 3 and 5 announce their states as 'blocked'. The APs of the first, second, fourth and sixth pairs 1, 2, 4 and 6 maintain their 'clear' state because for each, all their conflicting APs have a 'blocked' state. The APs of the third and fifth pairs 3 and 5 also do nothing because each already has a 'blocked' state.

After the second iteration of steps S250 and S260, the number of 'clear' APs increase from three to four (APs of the first, second, fourth and sixth pairs 1, 2, 4 and 6).

Accordingly, in the example discussed above with reference to FIG. 6, if M=0, one AP in the wireless network 100 would transmit during the same time slot, if M=1, three APs in the wireless network 100 would transmit during the same time slot, and if M=2, four APs in the wireless network 100 would transmit during the same time slot. Thus, in accordance with the method of scheduling transmissions according to an example embodiment, values of the threshold M greater than 0 may increase utilization of the APs performing the method.

Thus, the method for scheduling wireless transmissions according to an example embodiment provides a network operator with the ability to schedule transmission in such a way that, for each time slot, the number of simultaneous transmissions is maximized or increased while, at the same time, no collisions occur. Accordingly, a throughput of the network may be improved. Further, because the method is distributed, the method may be performed by a number of APs without the need to incorporate a central controller or scheduler.

Example embodiments being thus described, it will be obvious that the same may be varied in many ways. Such variations are not to be regarded as a departure from example embodiments, and all such modifications are intended to be included within the scope of example embodiments.

What is claimed:
1. A method of scheduling a data transmission in a current time frame in a wireless network including a first node and a plurality of second nodes, the method including:
   identifying conflicts at the first node by
      sending an announcement message from the first node to neighboring nodes from among the plurality of second nodes indicating that the first node intends to participate in a first communication with a first terminal during the current frame, and
      receiving, in response to the sent announcement message, a report message from any conflicting nodes at the first node, each conflicting node being a node from among the neighboring nodes which intends to participate in a communication during the current time frame;
   resolving the conflicts identified at the first node by
      selecting one of (1) maintaining a state of the first node as a clear state and (2) changing the state of the first node to a blocked state based on the received report messages; and
   scheduling the first communication for the current time frame, if the state of the first node is the clear state after the resolving conflicts step, wherein the resolving conflicts step further includes a clear determination operation including
  sending a first outgoing status message from the first node to the neighboring nodes indicating the status of the first node,
  receiving a first incoming status message from any conflicting nodes, each incoming status message indicating a status of one of the conflicting nodes,
  if the state of the first node is the clear state, maintaining the state of the first node, and
  if the state of the first node is the blocked state, selecting one of (1) maintaining the state of the first node as the blocked state and (2) changing the state of the first node to the clear state based on the received first incoming messages, and
a block determination operation including
  sending a second outgoing status message from the first node to the neighboring nodes indicating the status of the first node,
  receiving a second incoming status message from any conflicting nodes, each second incoming status message indicating a status of one of the conflicting nodes,
  if the state of the first node is the blocked state, maintaining the state of the first node, and
  if the state of the first node is the clear state, selecting one of (1) maintaining the state of the first node as the clear state and (2) changing the state of the first node to the blocked state based on the received second incoming status messages.

2. The method of claim 1, wherein the first communication is a downlink communication.

3. The method of claim 2, wherein each received report message includes an indication of the conflicting node corresponding to the received report message and a priority value associated with the corresponding conflicting node, and wherein the resolving conflicts step includes
  determining whether a priority value of the first node is less than any of the priority values of the conflicting nodes, and
  changing the state of the first node to a blocked state if the determination indicates the priority value of the first node is less than any of the priority values of the conflicting nodes.

4. The method of claim 1, wherein the resolving conflicts step further includes
  repeating the clear determination and block determination operations a reference number of times.

5. The method of claim 1, wherein if the state of the first node is the blocked state at a beginning of the clear determination operation, the clear determination operation includes changing the state of the first node to the clear state if the received first incoming status messages indicate the statuses of all the conflicting nodes are the blocked state.

6. The method of claim 1 wherein if the state of the first node is the clear state at a beginning of the block determination operation, the block determination operation includes changing the state of the first node to the blocked state if any of the received first incoming status messages indicate the status of one of the conflicting nodes having a priority value greater than the priority value of the first node is the clear state.

7. The method of claim 1, wherein the first communication is an uplink communication.

8. The method of claim 7, wherein the received report message includes an indication of the conflicting node corresponding to the received report message and a priority value associated with the corresponding conflicting node, and wherein the resolving conflicts step includes
  determining whether a priority value of the first node is less than any of one or more priority values of the conflicting nodes, and
  changing the state of the first node to a blocked state if the determination indicates the priority value of the first node is less than any of the one or more priority values of the conflicting nodes.

9. The method of claim 1, wherein the resolving conflicts step further includes
  repeating the clear determination and block determination operations a reference number of times.

10. The method of claim 1 wherein if the state of the first node is the blocked state at a beginning of the clear determination operation, the clear determination operation includes changing the state of the first node to the clear state if the received first incoming status messages indicate the statuses of all the conflicting nodes are the blocked state.

11. The method of claim 1 wherein if the state of the first node is the clear state at a beginning of the block determination operation, the block determination operation includes changing the state of the first node to the blocked state if any of the received first incoming status messages indicate the status of one of the conflicting nodes having a priority value greater than the priority value of the first node is the clear state.

12. The method of claim 1, wherein the first node selects one or more nodes from the plurality of second nodes as the neighboring nodes based on signal parameters of each of the second nodes.

13. The method of claim 12, wherein the signal parameters include at least one of one of a signal-to-interference ratio (SIR) and a signal strength measured by the first terminal.

14. The method of claim 1 wherein the first and second nodes are access points (APs), the first and second terminals are user equipment (UEs).

15. The method of claim 1, further comprising:
  facilitating identification of conflicts at the second nodes by
    receiving, at the first node, one or more announcement messages from one or more third nodes, each third node being a node from among the second nodes that intends to participate in a communication during the current time frame, and
    sending one or more report messages from the first node to the third nodes in response to the one or more announcement messages received at the first node, the one or more report messages each indicating that the first node intends to participate in a communication during the current time frame.

16. An network apparatus for providing supporting wireless communications of a user equipment (UE) in a wireless communications network including a plurality of network nodes, the apparatus comprising:
  a receiver unit configured to receive data from the UE and one or more of the plurality of network nodes;
  a transmitting unit configured to transmit data to the UE and one or more of the plurality of network nodes;
  a memory unit configured to store parameters corresponding with characteristics of one or more of the plurality of network nodes; and
  a processing unit coupled to the transmitting unit, the receiving unit, and the memory unit and configured to control operations associated scheduling a data transmission operation with the UE including, identifying conflicts at the network apparatus by
sending an announcement message to neighboring nodes from among the plurality of network nodes indicating that the network apparatus intends to participate in a first communication with the UE during a current frame, and
receiving, in response to the sent announcement message, a report message from any conflicting nodes, the each conflicting node being a node from among the neighboring nodes which intends to participate in a communication during the current time frame,
resolving the conflicts identified at the network apparatus by
electing one of (1) maintaining an internal state as a clear state and (2) changing the internal state to a blocked state based on the received report messages, and
scheduling the first communication for the current time frame, if the internal state is the clear state after the resolving conflicts step,
wherein the resolving conflicts step further includes a clear determination operation including
sending a first outgoing status message from the first node to the neighboring nodes indicating the status of the first node,
receiving a first incoming status message from any conflicting nodes, each incoming status message indicating a status of one of the conflicting nodes,
if the state of the first node is the clear state, maintaining the state of the first node, and
if the state of the first node is the blocked state, selecting one of (1) maintaining the state of the first node as the blocked state and (2) changing the state of the first node to the clear state based on the received first incoming messages, and
a block determination operation including
sending a second outgoing status message from the first node to the neighboring nodes indicating the status of the first node,
receiving a second incoming status message from any conflicting nodes, each second incoming status message indicating a status of one of the conflicting nodes,
if the state of the first node is the blocked state, maintaining the state of the first node, and
if the state of the first node is the clear state, selecting one of (1) maintaining the state of the first node as the clear state and (2) changing the state of the first node to the blocked state based on the received second incoming status messages.

17. The network apparatus of claim 16, wherein the processing apparatus is further configured to control operations including facilitating identification of conflicts at the second nodes by,
receiving, at the network apparatus, one or more announcement messages from one or more third nodes, each third node being a node from among the second nodes that intends to participate in a communication during the current time frame, and
sending one or more report messages from the network apparatus to the third nodes in response to the one or more announcement messages received at the first node, the one or more report messages each indicating that the first node intends to participate in a communication during the current time frame.

* * * * *